(12) United States Patent
Sudo et al.

(10) Patent No.: US 7,072,416 B1
(45) Date of Patent: Jul. 4, 2006

(54) TRANSMITTING/RECEIVING DEVICE AND TRANSMITTING/RECEIVING METHOD

(75) Inventors: Hiroaki Sudo, Yokohama (JP); Yoshimasa Shirasaki, Fujisawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/582,558

(22) PCT Filed: Nov. 8, 1999

(86) PCT No.: PCT/JP99/06188

§ 371 (c)(1),
(2), (4) Date: Jun. 29, 2000

(87) PCT Pub. No.: WO00/28688

PCT Pub. Date: May 18, 2000

(30) Foreign Application Priority Data

| Nov. 6, 1998 | (JP) | ................................ 10-316417 |
| Aug. 4, 1999 | (JP) | ................................ 11-220827 |

(51) Int. Cl.
H04L 27/04 (2006.01)
H04L 27/12 (2006.01)
H04L 27/20 (2006.01)

(52) U.S. Cl. .................................................... 375/295

(58) Field of Classification Search ................ 375/259, 375/262, 265, 280, 316; 370/242, 359, 537; 332/104; 714/786
See application file for complete search history.

(56) References Cited

U.S. PATENT DOCUMENTS

| 3,909,721 A | * | 9/1975 | Bussgang et al. ............ 375/280 |
| 4,389,636 A | * | 6/1983 | Riddle, Jr. .................... 341/71 |
| RE34,896 E | * | 4/1995 | Calvignac et al. .......... 370/359 |
| 5,642,368 A | * | 6/1997 | Gerson et al. .............. 714/786 |
| 6,075,815 A | | 6/2000 | Chheda et al. |

FOREIGN PATENT DOCUMENTS

| EP | 0589709 A2 | 4/1994 |
| JP | 645135 | 1/1989 |
| JP | 05083229 | 4/1993 |
| JP | 5167633 | 7/1993 |
| JP | 5276211 | 10/1993 |
| JP | 5327807 | 12/1993 |
| JP | 738448 | 2/1995 |
| WO | 9624989 | 8/1996 |
| WO | 9917509 | 4/1999 |

OTHER PUBLICATIONS

Chinese Office Action dated Jul. 9, 2004 with English translation.

(Continued)

Primary Examiner—Mohammed Ghayour
Assistant Examiner—Curtis Odom
(74) Attorney, Agent, or Firm—Stevens, Davis, Miller & Mosher, LLP

(57) ABSTRACT

In a modulation method such as 8PSK or a 16PSK in which a sender device expresses a symbol by using three or more bits, important information is arranged at least at only one of the first and second bits, a receiver device extracts the important information from at least one of the first and second bits of the received signal, and thereby communication control is carried out based on the important information.

10 Claims, 5 Drawing Sheets

OTHER PUBLICATIONS

L. Xiaogong, et al.; "Simulation Method of 8PSK Trellis—Coded and Decoding," Journal of Harbin Engineering University, vol. 18, No. 5, Oct. 1997, pp. 1-7.
Korean Office Action dated Mar. 28, 2002.
English translation of JP 64-5135.
Korean Office Action dated Sep. 17, 2002.
English translation of Korean Office Action.
Supplementary European Search Report dated Jul. 29, 2004.
Morelos-Zaragoza, et al., "Coded Modulation for Satellite Broadcasting," IEEE Global Telecommunications Conference, XP010219991, pp. 31-35, Nov. 1996.
Huan-Bang Li et al., "Multiple Block Coded Modulations and Applications to UEP," IEEE International Conference on Universal Personal Communications, XP010248757, pp. 489-493, Oct. 1997.
Isaka M. et al. "Error Performance Analysis of Multilevel Coded Asymmetric 8-PSK Modulation with Multistage Decoding and Unequal Error Protection," IEEE International Symposium on Information Theory, XP002290514, p. 210, Aug. 1998.

* cited by examiner

BIT ON WHICH IMPORTANT INFORMATION IS PLACED

BIT ON WHICH IMPORTANT INFORMATION IS PLACED

TRANSMITTING/RECEIVING DEVICE AND TRANSMITTING/RECEIVING METHOD

TECHNICAL FIELD

The present invention relates to a transmission/reception apparatus, and in particular, to a transmission/reception apparatus for an Orthogonal Frequency Division Multiplexing system (hereinafter referred to as "OFDM transmission/reception apparatus").

BACKGROUND ART

A conventional OFDM transmission/reception apparatus is explained with reference to FIG. 1 below. FIG. 1 is a block diagram illustrating a configuration of a conventional OFDM transmission/reception apparatus.

In FIG. 1 parallel-serial converter (hereinafter referred to as "P/S converter") 101 inserts important information into transmission data. This important information refers to a kind of information normal communication of which is likely to be difficult to be maintained if the other end of communication has a poor error rate characteristic during reception. That is, the important information above is a kind of information requiring a better error rate characteristic than other information (transmission data, for example).

An example of the important information above is retransmission information or control information, etc. Retransmission information refers to information retransmitted to the other end of communication according to a retransmission command issued by the other end of communication. Control information refers to information used for the user at the other end of communication to reliably receive an appropriate signal. Examples of control information can be information indicating bursts in a communication frame to be received by the other end of communication and information indicating the current modulation system during adaptive modulation, etc.

Serial-parallel converter (hereinafter referred to as "S/P converter") 102 converts the transmission signal, which is the output of P/S converter 101, to a plurality (here 4) of signals.

Mapping circuits 103 carry out primary modulation on the signals from S/P converter 102 and send the primary-modulated signals to Inverse Fast Fourier Transform (hereinafter referred to as "IFFT") circuit 104. IFFT circuit 104 performs inverse Fourier transform processing on the primary-modulated signals. D/A converter 105 converts the transmission signal, which is the output of IFFT circuit 104, to an analog signal.

On the other hand, A/D converter 106 converts a reception signal to a digital signal and sends it to Fast Fourier Transform (hereinafter referred to as "FFT") circuit 107. FFT circuit 107 performs Fourier transform processing on the output signal of A/D converter 106.

Delay detectors 108 perform delay detection processing on the subcarriers obtained by Fourier transform and determination circuits 109 determine delay detection processing. P/S converter 110 converts a plurality of signals from determination circuits 109 to a single signal and S/P converter 111 extracts important information from the output of P/S converter 110.

Then, the transmission/reception operations of the conventional apparatus with such a configuration are explained.

After important information is inserted by P/S converter 101, the transmission data is converted to a plurality of signals by S/P converter 102. The plurality of signals from S/P converter 102 are subjected to primary modulation by mapping circuits 103. The primary-modulated signals are subjected to inverse Fourier transform processing by IFFT circuit 104. The signals subjected to inverse Fourier transform processing by IFFT circuit 104 are converted to a digital signal by D/A converter 105 and transmitted.

The reception signal is converted to an analog signal by A/D converter 106 and then subjected to Fourier transform processing by FFT circuit 107. The signals carried by subcarriers after Fourier transform processing are subjected to delay detection processing by delay detectors 108. The signals subjected to delay detection processing are determined by determination circuits 109 and sent to P/S converter 110. A plurality of signals from determination circuits 109 are converted to a single signal by P/S converter 110 and sent to S/P converter 111. S/P converter 111 extracts retransmission information and reception data from the single signal.

In this way, by the transmitter inserting important information into the transmission signal, and the receiver extracting important information from the reception signal and carrying out reception processing based on the extracted important information, the receiver can receive the signal transmitted by the transmitter correctly. This allows a smooth communication between the transmitter and receiver.

If retransmission information is taken as an example of important information, by the transmitter inserting retransmission information into the transmission signal and the receiver extracting the retransmission information from the reception signal, the receiver can send an appropriate retransmission command to the transmitter. That is, the receiver can send back a signal with information carried on a control channel indicating which cell of which burst had an error.

However, the conventional apparatus has problems as shown below. That is, in the conventional apparatus, as the transmission efficiency is improved, the channel quality deteriorates, and the more the transmission efficiency is improved, the higher the probability that the receiver will not correctly receive the signal (for example, important information and transmission data) sent by the transmitter is. That is, the higher the transmission efficiency, the worse the error rate characteristic of important information in the receiver. As a result, it will be difficult for the receiver to maintain correct reception and it will be difficult to maintain a normal communication between the transmitter and receiver as a whole.

Here, suppose the modulation system is changed from QPSK to 8PSK to improve the transmission efficiency.

In 8PSK, one symbol is expressed with 3 bits. As shown in FIG. 2, in the first bit, "0" and "1" are switched round every 180 degrees on an I-Q plane; in the second bit, "0" and "1" are switched round every 90 degrees on the I-Q plane; and in the third bit, "0" and "1" are switched round every 45 degrees on the I-Q plane. That is, every time the number of bits increases, the phase likelihood becomes half the phase likelihood of the preceding bit. Therefore, the phase likelihood of the third bit becomes half the QPSK phase likelihood, and thus errors occur most frequently in the third bit.

Here, when retransmission information is used as important information if the error rate characteristic of retransmission information in the receiver deteriorates as described above, the transmitter retransmits this retransmission information more frequently, which makes longer the time until the communication is completed. Normally, there is a limit to the number of retransmission times of certain information and if retransmission is not completed within this limit, error correction is not carried out for this information. This makes it impossible to maintain a normal communication when carrying out a communication, which requires an optimal error characteristic such as image communication.

Moreover, when information indicating the current modulation system is used as important information, if the error rate characteristic of this information deteriorates on the receiving side, it is difficult for the receiving side to recognize the modulation system used by the transmitting side, making it impossible for the receiver to receive the signal transmitted by the transmitter. This makes it impossible to maintain a normal communication between the transmitting side and receiving side.

SUMMARY OF THE INVENTION

The present invention has been implemented taking account of the situations described above and it is an objective of the present invention to provide a transmission/reception apparatus that will improve the transmission efficiency while maintaining the transmission quality of important information.

This objective is achieved in a modulation system that expresses 1 symbol of 8PSK or 16PSK, etc. using 3 or more bits by placing information selected from all information to be communicated on at least one of the first bit or second bit only.

BEST MODE FOR CARRYING OUT THE INVENTION

EMBODIMENT

With reference now to the attached drawings, an embodiment of the present invention is explained in detail below.

The transmission/reception apparatus according to an embodiment of the present invention places important information on at least one of the first bit or second bit only in an OFDM-based radio communication that uses 8PSK as the modulation system and 4 carriers for transmission.

Figure 3:
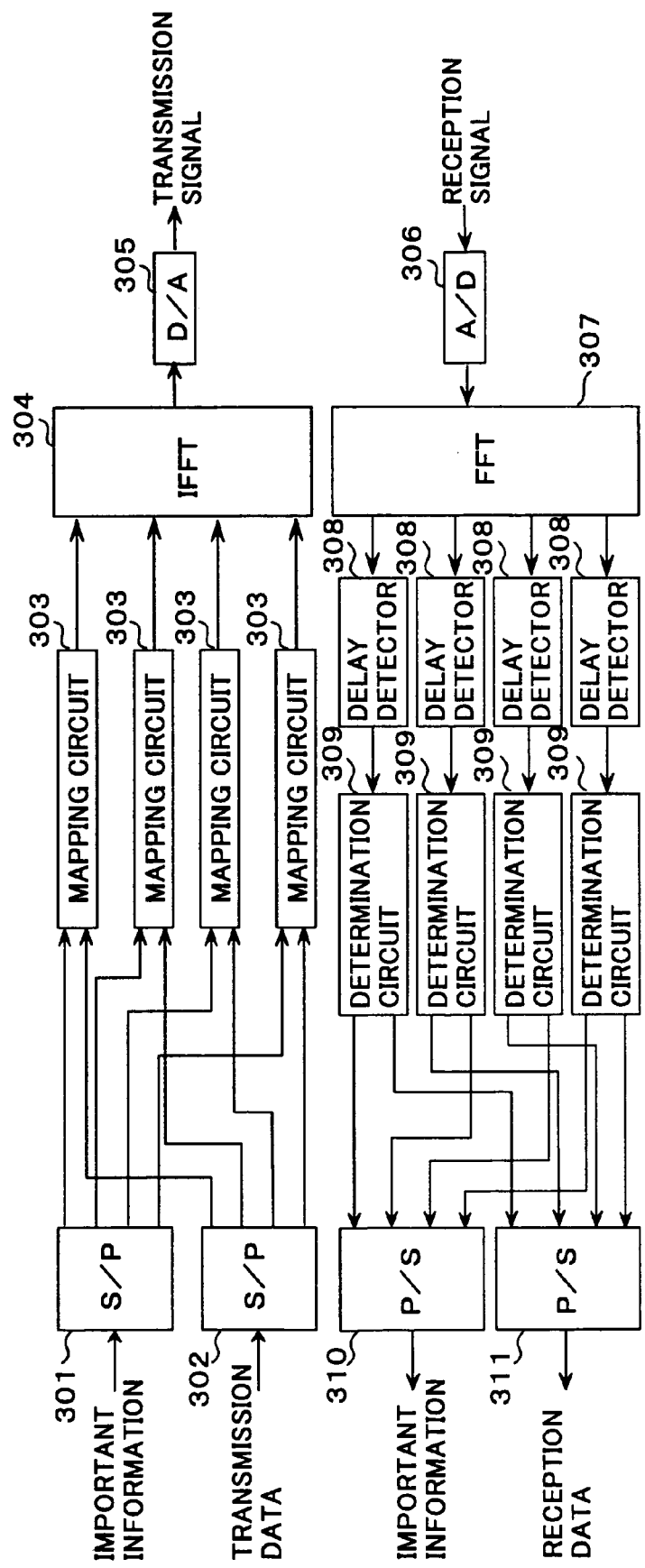
FIG. 3 is a block diagram showing a configuration of a transmission/reception apparatus according to an embodiment of the present invention.
Figure 4:
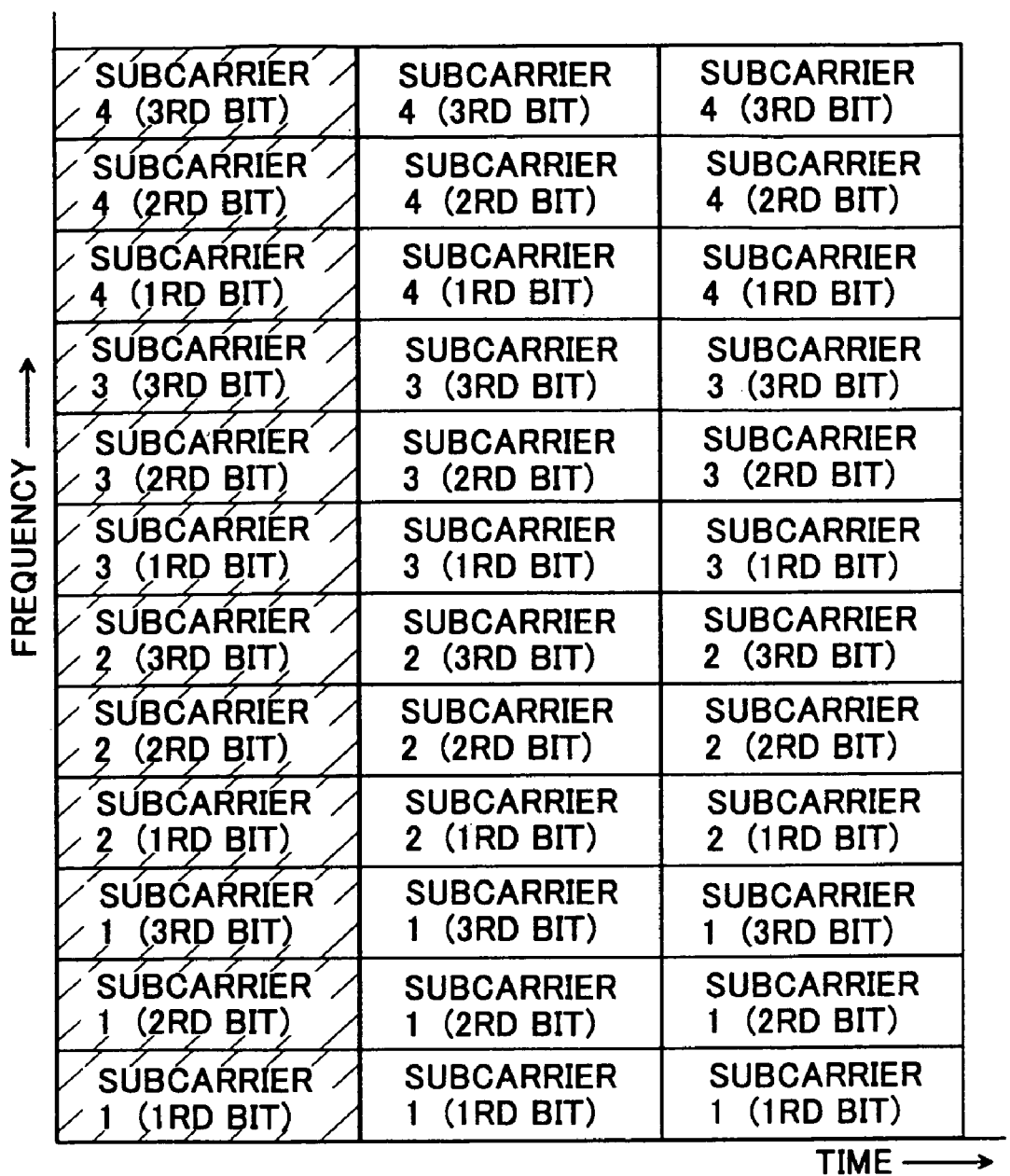
FIG. 4 is a schematic diagram showing a layout of important information according to the conventional transmission/reception apparatus.
Figure 4:
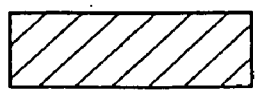
Figure 5:
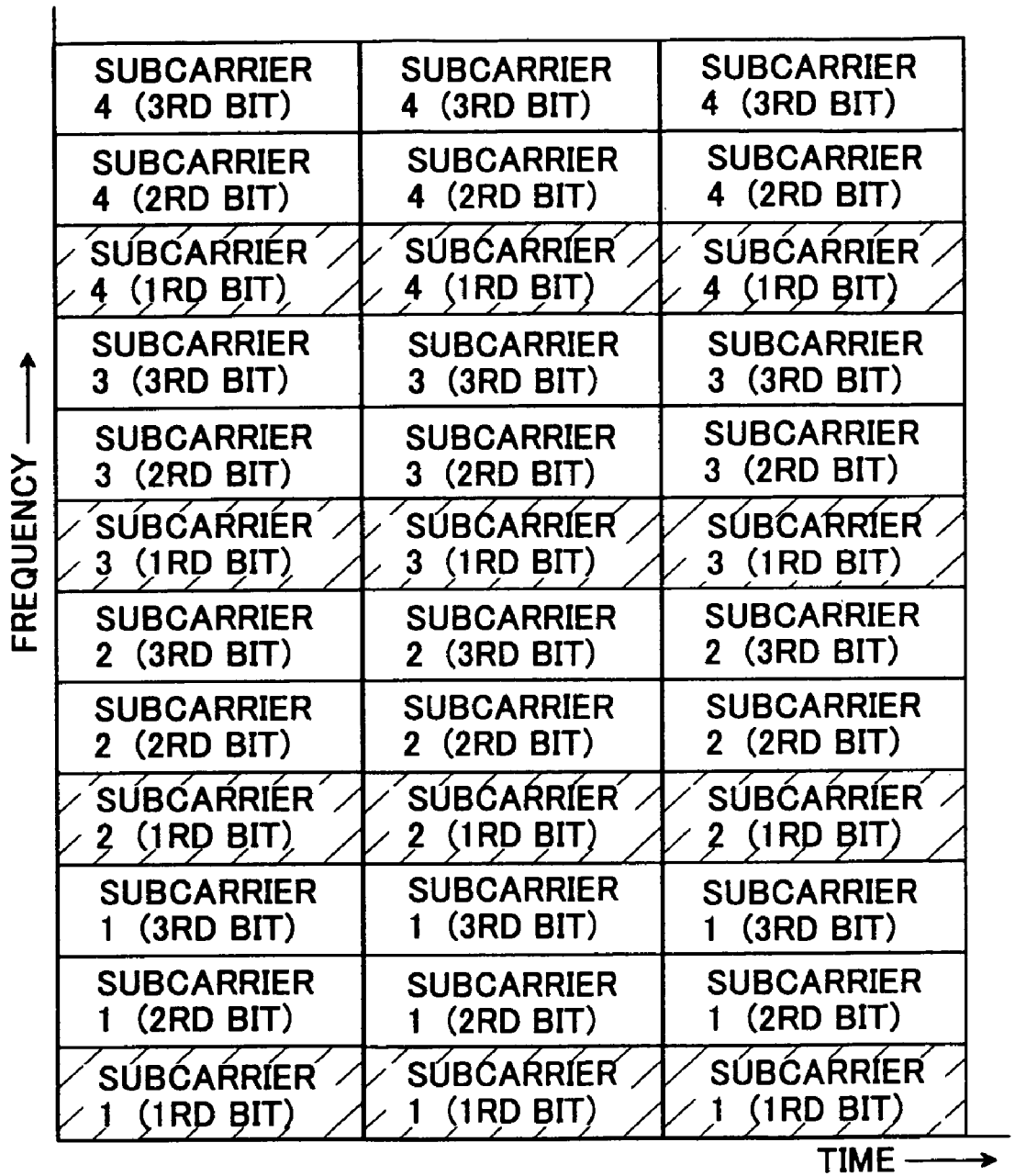
FIG. 5 is a schematic diagram showing a layout of important information of the transmission/reception apparatus according to the embodiment of the present invention.
Figure 5:

The transmission/reception apparatus according to the present embodiment is explained with reference to FIG. 3 to FIG. 5 below. FIG. 3 is a block diagram showing a configuration of the transmission/reception apparatus according to the embodiment of the present invention. FIG. 4 is a schematic diagram showing a layout of important information of the conventional transmission/reception apparatus using 8PSK modulation. FIG. 5 is a schematic diagram showing a layout of important information of the transmission/reception apparatus according to the embodiment of the present invention.

In FIG. 3, important information is converted to a plurality (here 4) of signals by S/P converter 301. Transmission data is converted to a plurality (here 4) of signals by S/P converter 302.

Here, important information refers to a kind of information normal communication of which is likely to be difficult to be maintained if the other end of communication has a poor error rate characteristic during reception. Examples of the important information above can be retransmission information or control information. Examples of control information can be information indicating bursts in a communication frame that the other end of communication should receive, information indicating the current modulation system during adaptive modulation, information that the other end of communication uses to distinguish a signal from the transmission/reception apparatus according to the present embodiment from other interference signals and information indicating which burst in a frame the other end of communication will receive.

Here, S/P converter 301 places important information on at least one of the first or second bit only. Here, suppose the important information is placed on the first bit only. This placement will be described in detail later.

The important information and transmission data are primary-modulated by mapping circuits 303 and then subjected to inverse Fourier transform processing by IFFT circuit 304. The transmission data subjected to inverse Fourier transform are converted to an analog signal by D/A converter 305. This transmission signal is subjected to predetermined radio transmission processing and then transmitted via an antenna.

On the other hand, a signal received via an antenna is subjected to predetermined radio reception processing and converted to a digital signal by A/D converter 306 and sent to FFT circuit 307. FFT circuit 307 performs Fourier transform processing on the digital-converted reception signal. This allows a signal carried by each subcarrier to be extracted. Signals carried by the subcarriers are subjected to delay detection processing by delay detectors 308. The signals carried by the subcarriers and subjected to delay detection processing are determined by determination circuits 309. Determination circuits 309 output the reception signal by separating the first bit from other bits (that is, second bit and third bit) in the reception signal.

The first bits of the reception signal are sent to P/S converter 310 and converted to a single signal. In this way, retransmission information is obtained from P/S converter 310 as reception data. On the other hand, the second bits and third bits of the reception signal are sent to P/S converter 311 and converted to a single signal. Thus, the reception data are obtained from P/S converter 311.

Here, the method of placing important information is explained with reference to FIG. 4 and FIG. 5. FIG. 4 shows a case in the prior art where important information is placed on all bits at a certain time on the time axis and FIG. 5 shows a case where important information is placed on the first bit only. In the present embodiment, transmission is performed with important information placed on the first bit only as shown in FIG. 5.

Figure 1:
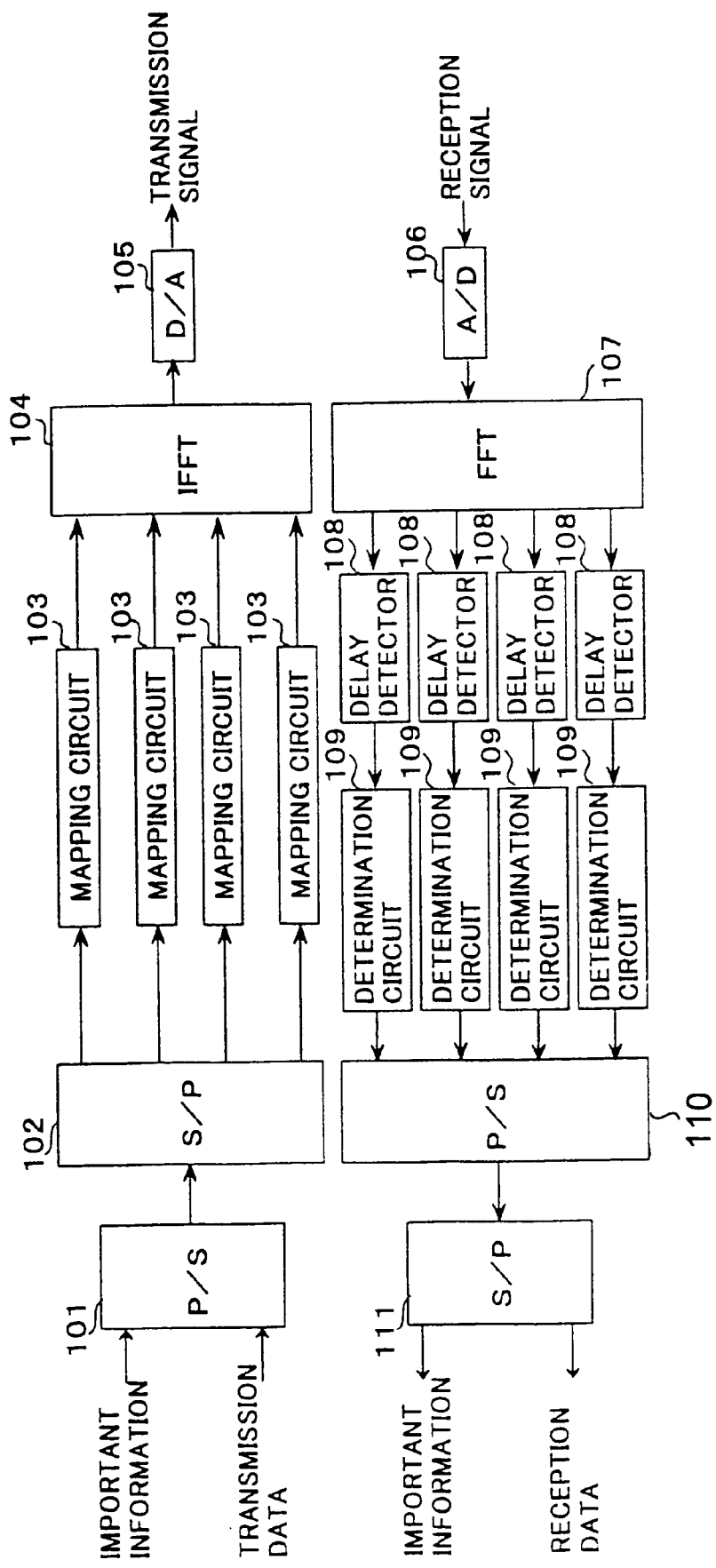
FIG. 1 is a block diagram showing a configuration of a conventional OFDM transmission/reception apparatus.
Figure 2:
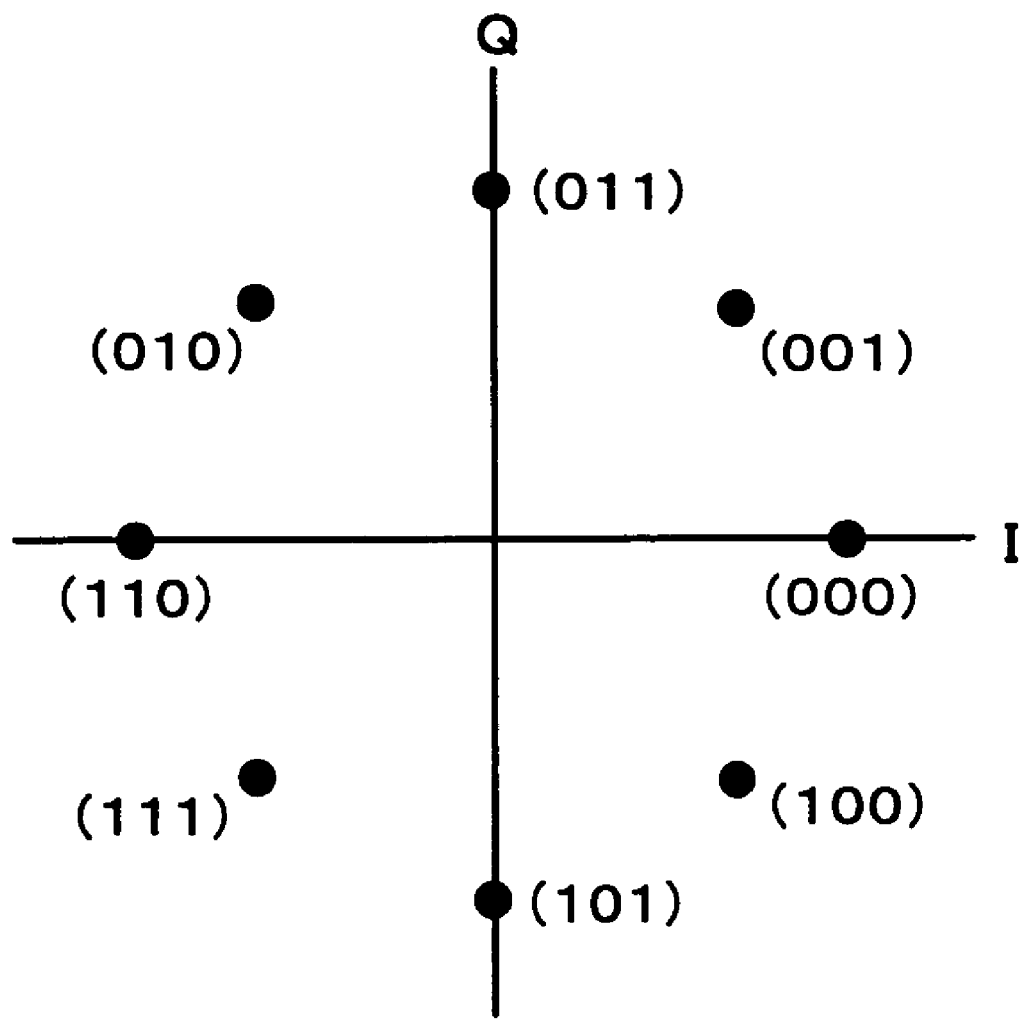
FIG. 2 is a schematic diagram showing an I-Q plane when 8PSK modulation is used in the conventional OFDM transmission/reception apparatus.

In the case of 8PSK, one symbol is expressed with 3 bits as shown in FIG. 2. As is clear from FIG. 2, in the first bit. "0" and "1" are switched round every 180 degrees on an I-Q plane; in the second bit, "0" and "1" are switched round every 90 degrees on the I-Q plane; and in the third bit, "0"

and "1" are switched round every 45 degrees on the I-Q plane. That is, every time the number of bits increases, the phase likelihood becomes half the phase likelihood of the preceding bit.

Therefore, in the case of 8PSK, the phase likelihood successively decreases on the first bit, second bit and third bit. The phase likelihood of the second bit is equivalent to the phase likelihood of QPSK. Therefore, as shown in FIG. 5, placing important information only on the first bit allows important information to be sent with high quality.

Here, communication control based on important information is explained with reference to FIG. 3 again. Here, communication control is explained for two cases when retransmission information is used as important information and when control information is used as important information. By way of example, a case where a first communication apparatus and second communication apparatus equipped with the transmission/reception apparatus shown in FIG. 3 perform a radio communication is explained.

First, communication control when retransmission information is used as important information is explained. The first communication apparatus extracts important information and reception data by carrying out the processing described above on the reception signal. The extracted important information and reception data are subjected to error detection processing.

Of the important information or reception data, the data from which some error has been detected by the error detection processing above are sent to a retransmission instruction section (not shown in the figure). The retransmission instruction section creates retransmission information to request retransmission of the data from which the error has been detected. That is, the retransmission instruction section instructs retransmission as communication control.

The retransmission information created by this retransmission control section is input to S/P section 301 as important information. The transmission data containing this important information are subjected to the processing above to become a transmission signal. This transmission signal is sent to the second communication apparatus.

On the other hand, the second communication apparatus extracts important information and reception data by carrying out the processing above on the reception signal. The extracted important information and reception data are subjected to error detection processing. The important information contains retransmission information that the first communication apparatus requests for retransmission of predetermined data. This important information is sent to a retransmission instruction section (not shown in the figure). The transmission data containing this important information is subjected to the processing above to become a transmission signal. This transmission signal is sent to the first communication apparatus.

Furthermore, the first communication apparatus extracts important information and reception data from the reception signal in like manner. This important information and reception data are subjected to error detection processing likewise. Since the important information is sent placed on the first bit by the second communication apparatus, the important information becomes a signal with an optimal error rate characteristic. That is, the retransmission information resent by the second communication apparatus as important information is extracted by the first communication apparatus without any error.

As shown above, even if the reception data in the first communication apparatus contains some error, the first communication apparatus sends retransmission information requesting for retransmission of the data in which the error occurred as important information to the second communication apparatus. Since the second communication apparatus can receive important information without errors, it can recognize the retransmission request of the first communication apparatus correctly.

Furthermore, the second communication apparatus sends the data retransmission of which was requested by the first communication to the first communication apparatus as important information, and thus the first communication apparatus can receive this important information correctly. Thus, the first communication apparatus can suppress the frequency of issuing a retransmission request again for the data retransmission of which was requested once. As a result, a normal communication is maintained favorably between the first and second communication apparatuses.

Then, communication control when control information is used as important information is explained. In the first communication apparatus, various control information is input to S/P section 301 as important information. As the various control information, information indicating bursts in a communication frame to be received by the second communication apparatus, information indicating the current modulation system, or information used for the second communication apparatus to identify the signal sent from the first communication apparatus from among other interference signals, etc. is used. The important information above and transmission data are subjected to the processing above to become a transmission signal. This transmission signal is sent to the second communication apparatus.

On the other hand, the second communication apparatus extracts important information and reception data from the reception signal by carrying out the processing above. The important information, that is, various control information is sent placed on the first bit by the first communication apparatus, and therefore is a signal with an optimal error rate characteristic. The extracted various control information is sent to a reception control section (not shown in the figure).

The reception control section performs reception control as communication control based on the extracted various control information. For example, if information indicating bursts to be received by the second communication apparatus is used in the communication frame as various control information, the reception control section sends a control signal instructing that processing should be only performed on the bursts shown in the information above to each section shown in FIG. 3. Furthermore, if information indicating the current modulation system is used as various control information, the reception control section sends a control signal instructing that a demodulation system corresponding to the modulation system indicated by the information above should be used to delay detectors 308.

As shown above, the first communication apparatus sends various control information to the second communication apparatus as important information and the second communication apparatus can receive this various control information without errors, thus enabling correct reception processing according to the instruction from the first communication apparatus. As a result, a normal communication is maintained favorably between the first and second communication apparatuses.

Here, the case where the first communication apparatus sends various control information to the second communication apparatus as important information is explained, but it goes without saying that the second communication apparatus can also send various control information to the first communication apparatus as important information.

As shown above, even if errors occur relatively more frequently on the third bit, placing important information on the first bit prevents the quality of important information from being affected. As a result, the present embodiment allows the quality of important information even in 8PSK transmission to be maintained the same as that in QPSK transmission. This allows a normal communication to be maintained between the transmitter and receiver.

For example, if retransmission information is used as important information, the transmitter places retransmission information on the first bit, and thus the receiver can maintain the error rate characteristic of retransmission information in an optimal condition. This can reduce the number of times the transmitter resends retransmission information, making it possible to maintain a normal communication even when carrying out communication requiring an extremely high error rate characteristic such as an image communication.

Furthermore, if information indicating the current modulation system is used as important information, the transmitter places this information on the first bit, and thus the receiver can maintain the error rate characteristic of this information favorably. This allows the receiver to receive the signal sent by the transmitter correctly by using a demodulation system corresponding to the modulation system used by the transmitter. As a result, a normal communication can be maintained even in the case where the adaptive modulation method is used.

The present embodiment explains the case where important information is placed on the first bit, but if important information is placed on any bit other than the third bit, which is more susceptible to errors, for example, the second bit, the quality of important information can be maintained at a level at least equivalent to that in QPSK transmission.

Furthermore, the present embodiment explains the case where important information is used as the information to be placed on the first bit or second bit. However, the present invention is not limited to this, but is also applicable to a case where information other than important information is used as the information to be placed on the above bits. That is, the information to be placed on the first bit or second bit can be selected from among all information to be sent (all information to be communicated) according to various conditions such as the level of importance.

It goes without saying that the present invention is applicable not only to a case where only one piece of information is always used as the information to be placed on the above bits but also to a case where the information to be placed on the above bits is changed at any time according to various conditions.

Furthermore, the present embodiment explains the case where 8PSK is used, but the present invention is also applicable to a modulation system in which one symbol is expressed with 3 or more bits, for example, 16PSK, 32PSK, etc., in like manner.

Furthermore, the present embodiment explains the case with an OFDM-based communication, but the present invention is applicable regardless of the communication system.

The transmission/reception apparatus of the present invention has a configuration comprising a modulator for modulating in such a way that one symbol is expressed using 3 or more bits and a placer for placing information selected from all information to be communicated on at least one of the first bit or second bit of a transmission signal.

Even with a modulation system such as 8PSK in which one symbol is expressed using 3 or more bits, the present invention is capable of transmitting information selected from information to be communicated (for example, retransmission information, important information and transmission data, etc.) with the quality equivalent to that in the case of using a QPSK modulation system in which one symbol is expressed with 2 bits, making it possible to improve the transmission rate of radio communication and maintain the quality of the information selected above as well.

The transmission/reception apparatus of the present invention has a configuration in which the information is selected from all information to be communicated according to the level of importance.

The present invention can use information selected according to the level of importance (for example, information requiring an optimal error rate to maintain a normal communication) as the information to maintain optimal the error rate characteristic during reception, thus making it possible to maintain a normal communication even if the channel quality deteriorates for the purpose of improving the transmission efficiency.

The transmission/reception apparatus of the present invention has a configuration comprising an extractor for extracting information from at least one of the first bit or second bit of a reception signal modulated according to a modulation system in which one symbol is expressed using 3 or more bits and a communication controller for performing communication control based on the extracted information.

Even with a modulation system such as 8PSK in which one symbol is expressed using 3 or more bits, the present invention can extract information from the reception signal with the quality equivalent to that in the case of using a QPSK modulation system in which one symbol is expressed with 2 bits and perform communication control based on the extracted information, making it possible to maintain a normal communication.

The transmission/reception apparatus of the present invention has a configuration in which the information is selected from all information to be communicated according to the level of importance.

The present invention can perform communication control based on the information selected according to the level of importance (for example, information requiring an optimal error rate to maintain a normal communication, etc.), making it possible to maintain a normal communication even in a case where the channel quality deteriorates for the purpose of improving the transmission rate.

The transmission/reception apparatus of the present invention has a configuration with the communication controller comprising a retransmission instructor for instructing the other end of communication to retransmit based on the information.

The present invention instructs the other end of communication to retransmit using retransmission information placed on the first or second bit of the reception signal even in a case where the channel quality deteriorates for the purpose of improving the transmission rate, making it possible to maintain a normal communication.

The transmission/reception apparatus of the present invention has a configuration with the communication controller comprising a reception controller for performing reception control on the reception signal based on the information.

The present invention performs reception control using information placed on the first or second bit of the reception signal even in a case where the channel quality deteriorates for the purpose of improving the transmission rate, making it possible to receive the reception signal correctly. This allows a normal communication to be maintained.

The base station apparatus according to the present invention is equipped with a transmission/reception apparatus comprising a modulator for modulating in such a way that one symbol is expressed using 3 or more bits and a placer for placing information selected from all information to be communicated on at least one of the first bit or second bit of a transmission signal.

Even with a modulation system such as 8PSK in which one symbol is expressed using 3 or more bits, the present invention is capable of transmitting information with the quality equivalent to that in the case of using a QPSK modulation system in which one symbol is expressed with 2 bits, making it possible to improve the transmission rate of radio communication and maintain the quality of the retransmission information as well.

The communication terminal apparatus of the present invention is equipped with a transmission/reception apparatus comprising a modulator for modulating in such a way that one symbol is expressed using 3 or more bits and a placer for placing information selected from all information to be communicated on at least one of the first bit or second bit of a transmission signal.

Even with a modulation system such as 8PSK in which one symbol is expressed using 3 or more bits, the present invention is capable of transmitting information with the quality equivalent to that in the case of using a OPSK modulation system in which one symbol is expressed with 2 bits, making it possible to improve the transmission rate of radio communication and maintain the quality of the retransmission information as well.

The base station apparatus according to the present invention has a configuration comprising an extractor for extracting retransmission information from at least one of the first bit or second bit of a reception signal modulated according to a modulation system in which one symbol is expressed using 3 or more bits and a retransmission instructor for instructing a radio station, which is the transmission source, to retransmit based on the extracted retransmission information using a control channel.

Even with a modulation system such as 8PSK in which one symbol is expressed using 3 or more bits, the present invention is capable of extracting retransmission information with the quality equivalent to that in the case of using a QPSK modulation system in which one symbol is expressed with 2 bits, making it possible to eliminate the need to instruct for the third time, for example, a mobile station which is the radio communication destination, to retransmit, reducing communication load on the other end of communication.

The communication terminal apparatus according to the present invention has a configuration comprising an extractor for extracting retransmission information from at least one of the first bit or second bit of a reception signal modulated according to a modulation system in which one symbol is expressed using 3 or more bits and a retransmission instructor for instructing a radio station, which is the transmission source, to retransmit based on the extracted retransmission information using a control channel.

Even with a modulation system such as 8PSK in which one symbol is expressed using 3 or more bits, the present invention is capable of extracting retransmission information with the quality equivalent to that in the case of using a QPSK modulation system in which one symbol is expressed with 2 bits, making it possible to eliminate the need to instruct for the third time, for example, a base station, which is the radio communication destination, to retransmit, reducing communication load on the other end of communication.

The transmission/reception method of the present invention comprises a modulating step of modulating in such a way that one symbol is expressed using 3 or more bits and a placing step of placing information selected from all information to be communicated on at least one of the first bit or second bit of a transmission signal.

Even with a modulation system such as 8PSK in which one symbol is expressed using 3 or more bits, the present invention is capable of transmitting information selected from information to be communicated (for example, retransmission information, important information and transmission data, etc.) with the quality equivalent to that in the case of using a QPSK modulation system in which one symbol is expressed with 2 bits, making it possible to improve the transmission rate of radio communication and maintain the quality of the information selected above as well.

The transmission/reception method of the present invention comprises an extracting step of extracting information from at least one of the first bit or second bit of a reception signal modulated according to a modulation system in which one symbol is expressed using 3 or more bits and a communication control step of performing communication control based on the extracted information.

Even with a modulation system such as 8PSK in which one symbol is expressed using 3 or more bits, the present invention can extract information from the reception signal with the quality equivalent to that in the case of using a QPSK modulation system in which one symbol is expressed with 2 bits and perform communication control based on the extracted information, making it possible to maintain a normal communication.

As described above, in a modulation system such as 8PSK and 16PSK in which one symbol is expressed using 3 or more bits, the transmission/reception apparatus of the present invention places information selected from all information to be communicated on at least one of the first bit or second bit only, making it possible to improve the transmission efficiency while maintaining the transmission quality of important information.

This application is based on the Japanese Patent Application No. HEI 10-316417 filed on Nov. 6, 1998 and the Japanese Patent Application No. HEI 11-220827 filed on Aug. 4, 1999, entire content of which is expressly incorporated by reference herein.

What is claimed is:
1. A transmission apparatus comprising:
a converting section to which a first information sequence comprising a plurality of bits in series and a second information sequence comprising a plurality of bits in series are input through different routes and that divides each of the first information sequence and the second information sequence so as to generate a sequence of bits including at least one bit of the first information sequence and at least one bit of the second information sequence, in which the first information sequence is more important than the second information sequence; and
a modulation section that modulates the sequence of bits to provide a transmission signal in such a way that each of the symbols in the transmission signal is expressed using three or more bits on an orthogonal coordinate system including an in-phase component and a quadrature component,
wherein a bit corresponding to the first information sequence is arranged on at least the first bit of each of the symbols, and bits corresponding to the first information sequence are arranged on both the first bit and the second bit of at least one of the symbols.

2. The transmission apparatus according to claim 1, wherein the first information sequence is important according to the level of importance for maintaining a normal communication.

3. The transmission apparatus according to claim 1, wherein information to be arranged on one or both of the first bit and the second bit of each symbol of the transmission signal can be changed at any time according to the level of importance.

4. The transmission apparatus according to claim 1, wherein the first information is separated from all information to be communicated and the second information is other than the first information among all the information to be communicated.

5. The transmission apparatus according to claim 1, further comprising a circuit that performs inverse Fourier transform processing on the modulated first information and second information.

6. A base station apparatus comprising the transmission apparatus of any one of claims 1 to 5, wherein the base station apparatus transmits the transmission signal via an antenna.

7. A communication terminal apparatus comprising the transmission apparatus of any one of claims 1–5, wherein the communication terminal apparatus transmits the transmission signal via an antenna.

8. A transmission method comprising the steps of:
inputting a first information sequence comprising a plurality of bits in series and a second information sequence comprising a plurality of bits in series through different routes,
dividing each of the first information sequence and the second information sequence so as to generate a sequence of bits including at least one bit of the first information sequence and at least one bit of the second information sequence, in which the first information sequence is more important than the second information sequence; and
modulating the sequence of bits to provide a transmission signal in such a way that each of the symbols is expressed using three or more bits on an orthogonal coordinate system including an in-phase component and a quadrature component,
wherein a bit corresponding to the first information sequence is arranged on at least the first bit of each of the symbols, and bits corresponding to the first information sequence are arranged on both the first bit and the second bit of at least one of the symbols.

9. The transmission method according to claim 8, wherein the first information sequence is important according to the level of importance for maintaining a normal communication.

10. The transmission apparatus according to claim 8, wherein information to be arranged on one or both of the first bit and the second bit of each symbol of the transmission signal can be changed at any time according to the level of importance.

* * * * *